United States Patent [19]

Hosaka et al.

[11] 4,358,793
[45] Nov. 9, 1982

[54] BEAM SCANNING COPYING APPARATUS

[75] Inventors: Yasuo Hosaka, Tokyo; Masasumi Yana, Yokohama, both of Japan

[73] Assignee: Tokyo Shibaura Denki Kabushiki Kaisha, Kawasaki, Japan

[21] Appl. No.: 205,166

[22] Filed: Nov. 10, 1980

[30] Foreign Application Priority Data

Nov. 13, 1979 [JP] Japan .................................. 54/14607

[51] Int. Cl.³ ...................... G03G 15/28; H04N 1/30; H04N 1/04
[52] U.S. Cl. ............................... 358/286; 346/153.1; 358/300; 355/11
[58] Field of Search ............................. 355/8, 3 R, 11; 358/300, 285, 286; 346/108, 153.1

[56] References Cited

U.S. PATENT DOCUMENTS

| 4,070,089 | 1/1978 | Grafton | 355/8 X |
| 4,169,275 | 9/1979 | Gunning | 358/300 |
| 4,212,018 | 7/1980 | Ohnishi et al. | 346/108 |
| 4,302,782 | 11/1981 | Gunning et al. | 358/300 |

FOREIGN PATENT DOCUMENTS

| 53-58245 | 5/1978 | Japan . |
| 53-89311 | 8/1978 | Japan . |
| 54-31217 | 3/1979 | Japan . |

Primary Examiner—Richard L. Moses
Attorney, Agent, or Firm—Schuyler, Banner, Birch, McKie & Beckett

[57] ABSTRACT

This disclosure concerns a beam scanning copying apparatus having transmission function and receiving function of a facsimile apparatus besides reproduction function.

The apparatus comprises light generating means for generating a first and second laser beam, modulator means for modulating the second laser beam in accordance with modulating signals, light deflecting means having at least a first and second reflecting face for deflecting the first and second laser beam with predetermined angular ranges, the first face reflecting the light from the first laser beam to produce a first reflected beam and the second face reflecting the light from the modulator means to produce a second reflected beam, a light splitter for splitting the first reflected beam into a first and second split beam, the first split beam being directed onto a document for scanning the document, first photoelectric means for detecting light reflected from the document and for converting it into electrical signals corresponding to an image on the document, storage means responsive to variable clock signals for receiving and storing the electrical signals, timing means coupled to the storage means and responsive to the second split beam for generating the variable clock signals for controlling the timing of the entry of the electrical signals into the storage means, and recording medium means scanned by the second reflected beam for recording information according to the modulating signals.

18 Claims, 5 Drawing Figures

BEAM SCANNING COPYING APPARATUS

BACKGROUND OF THE INVENTION

This invention relates to a beam scanning copying apparatus for reading out document information by a scanning laser beam and recording this information onto a recording medium. More particularly, the invention relates to a copying apparatus having a transmitting and receiving function, in addition to a simple reproduction function, for use in a facsimile system apparatus.

Generally, a copying apparatus has a function to reproduce documents locally while a facsimile apparatus has a function to reproduce document information sent by electrical signals from a remote apparatus. The prior art contains systems which combine both a copying apparatus function with a facsimile function; see for example, Japanese patent disclosure No. 54-31217 dated Mar. 18, 1979. A prior art copying method is described in Japanese patent disclosure No. 53-58245. In this disclosure a rotating light deflector having six light reflecting faces is irradiated by two laser beams. One beam irradiates one face of the deflector and is thereby reflected onto the document to be read. The other beam irradiates the other face and is reflected onto a recording medium. Consequently, scanning of the document and scanning of the recording medium occur simultaneously by the rotation of the light deflector. Light from the document is concentrated and converted into electrical signals for modulating the other laser beam scanning the recording medium. As a result, a reproduction image is obtained on the recording medium simultaneously with the scanning of the document.

A prior art high speed facsimile apparatus is described in Japanese patent disclosure No. 53-89311 for transmitting and receiving document images. In this disclosure, two laser beams, formed by splitting a single beam, irradiate two faces of a rotating mirror. The beam reflected from one face is directed onto a document, light reflected from the document is converted into signals for facsimile transmission to a remote apparatus. The beam reflected from the other face is modulated by a signal received from the remote apparatus; this modulated beam is then directed onto a recording medium to obtain the received document image.

If scanning is effected using a light deflector as described in the above-identified Japanese patent disclosures, the obtained picture signals have a higher resolution then used by other methods; for example, the signals obtained by solid scanning devices (i.e., diode arrays). However, the signals produced by a constantly rotating light deflector have inherent timing distortion. That is, since documents are generally placed in a planar position, the distance between the light deflector and the face of the document varies depending upon the scanned positions. Consequently, the scanning speed of the reflected light along the document will change. The electrical signals produced by the light reflected from the document will, likewise, be subject to this variation. If these signals are then transmitted to a remote copier as part of the facsimile system which does not also employ a rotating light deflector, the image produced at the remote copier will also be distorted. If, however, the remote receiving unit also employs a rotating deflector, the inherent distortion in such a receiving unit will cancel the signal distortion which modulates the light beam in the receiving unit. Because of the difficulty of matching rotating type deflector systems at both the receiving and transmitting end, it is desirable to eliminate timing distortion whenever possible.

SUMMARY OF THE INVENTION

It is one object of this invention to provide a copying apparatus having a transmission function and a receiving function of a facsimile apparatus, in addition to a reproduction function.

It is another object of this invention to provide a copying apparatus which obtains high resolution copies.

It is yet another object of this invention to provide a copying apparatus generating facsimile signals having no timing distortion.

It is a further object of this invention to provide a copying apparatus having a receiving function which results in copies having no distortion.

It is still another object of this invention to provide a copying apparatus wherein the transmitted facsimile signals have no timing distortion and non-distorted copies are produced.

According to this invention, the foregoing and other objects are attained by a beam scanning copying apparatus employing a timing means. The apparatus comprises: light generating means for generating a first and second laser beam, modulator means for modulating the second laser beam in accordance with modulating signals, light deflecting means having at least a first and second reflecting face for deflecting the first and second laser beam within predetermined angular ranges, the first face reflecting the light from the first laser beam to produce a first reflected beam and the second face reflecting the light from the modulator means to produce a second reflected beam, a light splitter for splitting the first reflected beam into a first and second split beam, the first split beam being directed onto a document for scanning the document, first photoelectric means for detecting light reflected from the document and for converting it into electrical signals corresponding to an image on the document, storage means responsive to variable clock signals for receiving and storing the electrical signals, timing means coupled to the storage means and responsive to the second split beam for generating the variable clock signals for controlling the timing of the entry of the electrical signals into the storage means, and recording medium means scanned by the second reflected beam for recording information according to the modulating signals.

BRIEF DESCRIPTION OF THE DRAWINGS

Other objects and features of the invention will become apparent to those skilled in the art as the disclosure is made in the following description of a preferred embodiment of the invention, as illustrated in the accompanying sheet of drawings in which.

DESCRIPTION OF THE PREFERRED EMBODIMENT

Figure 1:
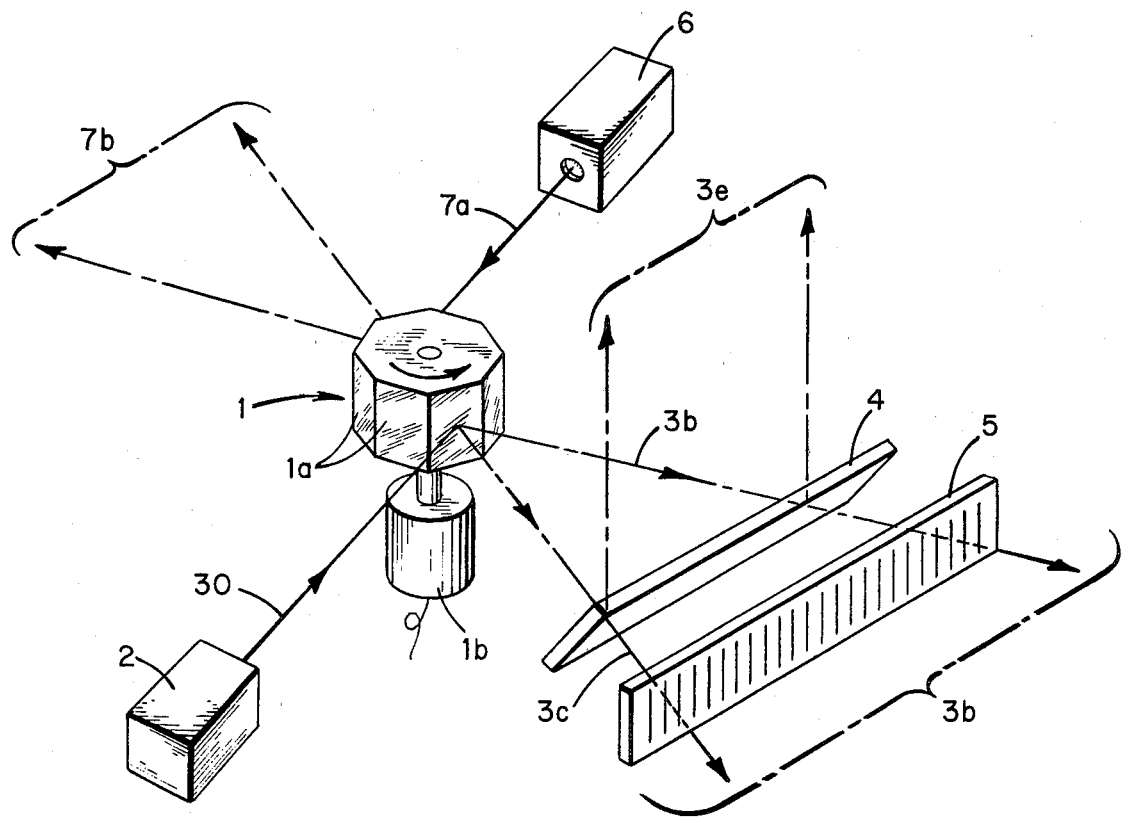
FIG. 1 shows a schematic view of one embodiment of optical system of the invention.

The principle of this invention will be explained with reference to FIG. 1.

A light deflector 1 comprises eight light reflecting faces 1a and a rotating motor 1b. A laser beam 30 projected from a light source 2 irradiates one of the light reflecting faces of reflector 1a; the beam 3b reflected from this face is used for scanning a document. That is, reflected beam 3b is guided through a light splitter (e.g., a half mirror 4) which produces beam 3e for scanning the document and beam 3c. Beam 3c is projected onto a timing plate 5. Timing plate 5 is made of a transparent material comprising a rectangular plate with opaque marks equidistantly arranged along the scanning direction. Timing plate 5 in conjunction with a photoelectric detector produces clock signals to correct timing distortion. In addition, timing plate 5 may be made of an opaque material having transparent marks equidistantly arranged along the scanning direction. When the reflectors 1a of light deflector 1 rotate, a scanning light beam 3c is produced which impinges on plate 5. This beam passes through the transparent portions of the scale and is directed onto a photoelectric detector (not shown). The detector produces variable clock signals which are dependent on the speed of the light beam at each position along the planar surface of timing plate 5. As will be shown with reference to the other figures, these signals are used to correct distortion.

Beam 3e, splitted by half mirror 4, scan the document (not shown) by the rotation of reflectors 1a. The light reflected from the document is detected by a photodetector and is used to reproduce the image on the document either locally or at a remote terminal.

A beam projected from an additional laser light source 6 is irradiated onto another light reflecting face of light deflector 1. The beam 7b reflected from this reflector is modulated by the electrical signals obtained from scanning the document and then directed onto a photosensitive recording medium to record the image on the document. The rotation of reflector 1a produces scanning across the recording medium.

As shown in FIG. 1, since the laser beam to read the document is splitted, it is possible to read and record at the same time, while also obtaining variable clock signals to correct distortion. As will be shown below, the use of the variable clock signals provides a copying apparatus with picture signals having high resolution and no timing distortion. Briefly, the variable clock signals obtained from the light passing through the timing plate is used for controlling the timing of the entry (or exit) of the picture signals into (or out of) a buffer memory. Because the distance between the light reflector and the timing plate varies depending on the scanned position, the position of each clock signal will vary. These positions correspond, in the same degree, to the variation in the electrical signals (i.e., distortion) produced by the rotating reflector for transmission to a remote unit. By using these variable clock signals to enter the electrical signals into memory and by using normal (i.e., uniform) clock signals to later read these signals out of memory; the distortion present in the entering signal will be corrected upon exiting from the memory. That is, assume a portion of an electrical signal has been expanded due to distortion and segments of that signal are then read into memory by several clock signals having expanded time positions. Upon subsequently reading those segments of the signal out of memory by corresponding uniform clock signals, they will no longer represent a distorted signal.

Figure 2:
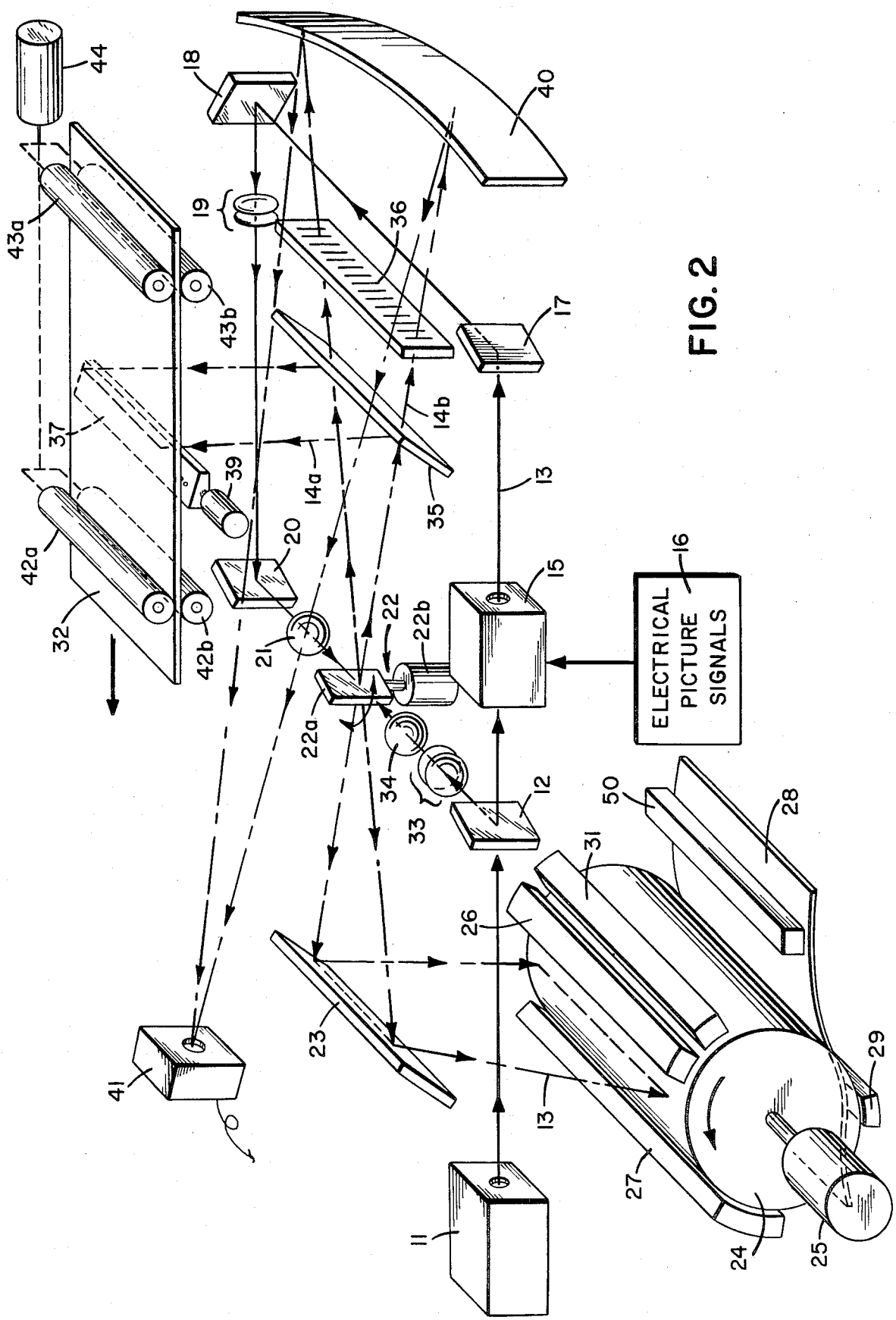
FIG. 2 shows a schematic view of another embodiment of optical system of the invention.

The system of a preferred embodiment of the present invention is shown in FIG. 2. A laser light source 11 (e.g., He-Ne) having 4 mw output is projected onto a light splitter 12 such as a half mirror. Half mirror 12 splits the irradiated beam, for example in a 3 to 2 ratio, into a laser beam 13 for recording picture signals and a laser beam 14 for reading a document.

The optical path of laser beam 13 for recording will now be explained. This laser beam is supplied to a light modulator 15 (e.g., an acousto-optical modulator) and is intensity modulated according to electrical picture signals 16. The modulated laser beam 13 is then projected onto a light deflector 22 such as a galvano mirror via reflecting mirrors 17 and 18, a collimator 19, a reflecting mirror 20 and a lens 21. Light deflector 22 comprises a reflecting plate 22a having two mirror faces and a motor 22b which oscillates the reflecting plate within a 90° range. One face of reflecting plate 22a reflects the modulated recording beam 13 and the other face reflects the reading beam 14. A rectangular reflecting mirror 23 reflects the light from plate 22a corresponding to beam 13 onto the surface of cylindrical drum 24 for recording information according to the modulating electrical signals. The oscillation of plate 22a produces scanning of the beam along the surface of drum 24.

Cylindrical drum 24 is an element of the copying apparatus which employs the well-known electrophotographic process. For example, the apparatus includes a photoconductive layer made of selenium which is placed on the face of cylindrical drum 24. As cylindrical drum 24 rotates in the direction indicated, the face of cylindrical drum 24 is uniformly electrified by a charger 26. Thereafter, the light reflected by plate 22a and 23 affect an image exposure on the selenium drum and an electrostatic image is formed in the face of cylindrical drum 24 corresponding to the modulated signal. This latent image is then developed by toners in a development device 27. Thereafter, a recording paper 28 will contact the developed toner image while the rear face of recording paper 29 is uniformly charged by an inverse polarity from charger 29. As a result, the toner image will be transferred onto recording paper 28. The transferred toner image is then fixed on the paper by a heat fixing device 30. Thereafter, the electrostatic latent image is erased and residual toners are removed by a cleaning device 31. Generally, erasing the latent image is effected by uniformly exposing the surface of the drum and brushing the residual toners. Of course, recording by laser beam for recording 13 may be affected by other methods, for example, recording directly onto a photosensitive paper.

The reading of picture signal from document 32 and producing variable clock signals to correct timing distortion are affected as follows. Laser beam 14 for reading information is projected onto another face of reflecting plate 22a of light deflector 22. Before impinging on face 22a, this beam passes through via a collimator 33 and a focusing lens 34. Laser beam 14 is then reflected by plate 22a and irradiated onto a light splitter 35 (e.g., a half mirror). One laser beam 14a for reading information is splitted by half mirror 35 and is projected onto document 32; the other splitted beam 14b for correcting distortion is irradiated onto a timing plate 37.

Figure 3:
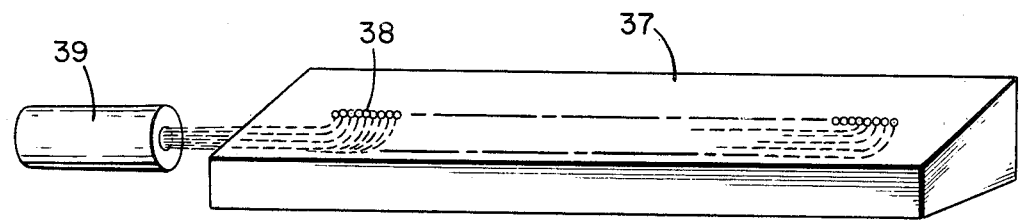
FIG. 3 shows a perspective view of the document light detector shown in FIG. 2.

As shown in FIGS. 2 and 3, laser beam 14a reflected from document 32 is gathered by light fibers 38 and detected by a photo-multiplier 39. This detecting device comprises a body 37 comprising light fibers for gathering the reflected light, and a photo-electric converting element 39 (e.g., photo-multiplier) for detecting the gathered light. The ends 38 of the light fibers are positioned along a line and are exposed to the surface of body 37. This detecting device is positioned so that the ends of the light fibers 38 may be parallel to the main scanning direction of laser beam 14b. Document 32 is sandwiched between conveying rollers 42a, 42b and 43a, 43b controlled by motor 44, for moving document 32 in the direction shown to permit scanning of a new line. Scanning of document 32 is effected by oscillation of reflecting plate 22a.

Laser beam 14b which passes through timing plate 36 is reflected by a reflecting mirror 40. This reflected beam is then gathered by a photo-electro coverting element 41 (e.g., a PIN diode). When reflecting plate 22a oscillates, timing plate 36 is, accordingly, scanned by laser beam 14b; the speed of the light beam across the surface of the plate is faster at the ends of the scale than the speed in the center. Plate 36 contains equidistant marks through which the light passes. In view of the variable speed of the beam along the surface passing through the equidistant marks, a variable clock signal is generated by element 41 which corresponds to the variation in the electrical signals (i.e., distortion) provided by the rotating reflector.

Focusing lenses 34 and 19 are designed so that a spot size (e.g. 8 dot/mm) of each laser beam is generated for recording and reading at the surface of cylindrical drum 24 and document 32, respectively. Preferably, the rotating speed of cylindrical drum 24 may be the same as moving speed of document 32. Moreover, motor 25 and motor 44 may be replaced by a single motor common to the recording and reading apparatus. As shown in FIG. 2, a single light source is used and two beams are formed by splitting this single beam. If desired, two separate laser light sources can be used, as shown in FIG. 1.

Figure 4:
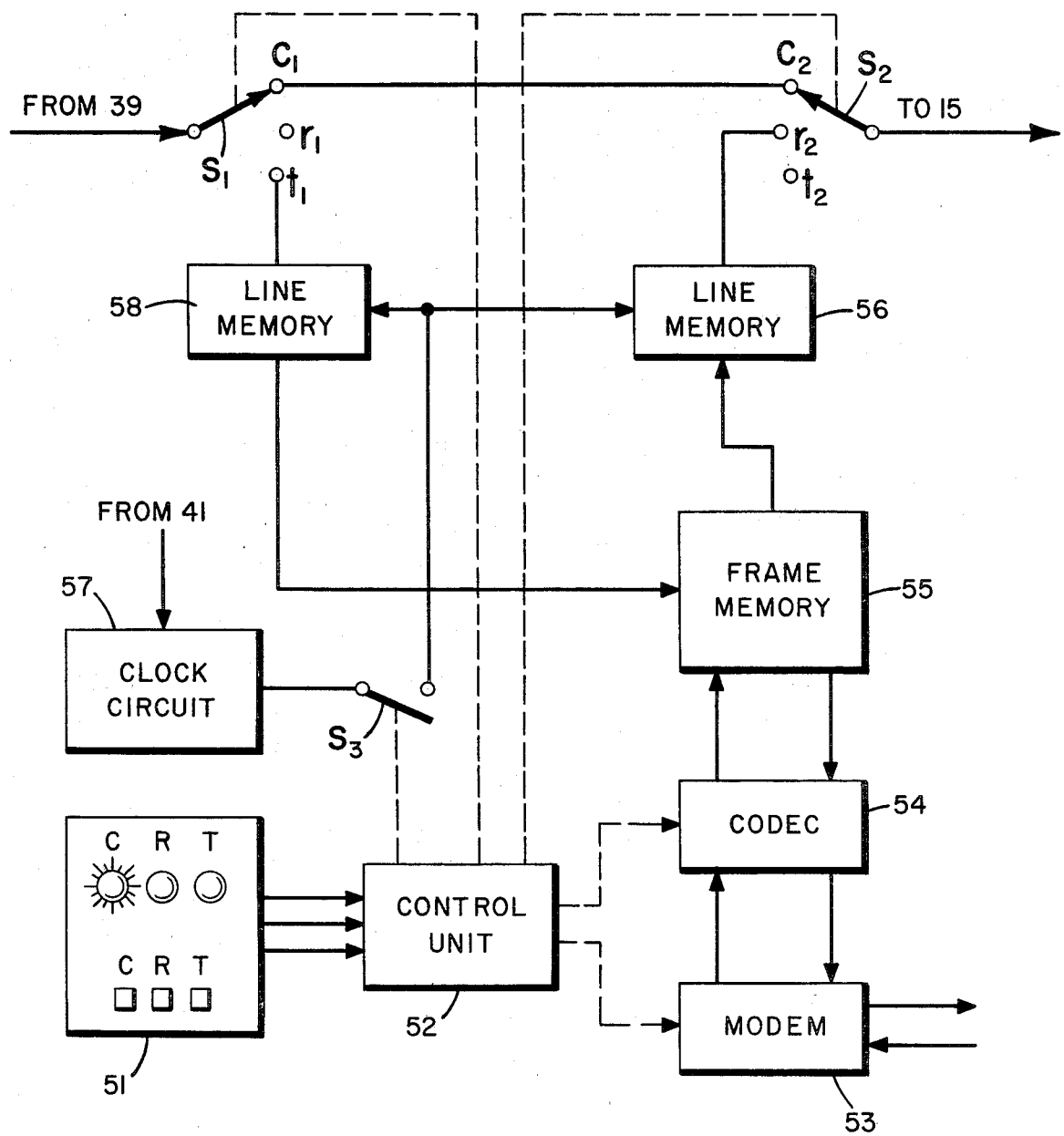
FIG. 4 shows a summary block diagram of one embodiment of the circuitry of the invention.

FIG. 4 shows one embodiment of the electrical system for controlling the optical systems of FIG. 2 by either three mode, i.e. reproduction mode, receiving mode and transmission mode. A mode selecting board 51 selects at least one of these three modes and a control part 52 executes control according to the selected mode. In the reproduction mode, analogue switches $S_1$, $S_2$ are connected to terminals $C_1$, $C_2$. Therefore, electrical picture signals from photo-multiplier 39, representing modulating signals, are directly supplied to optical modulator 15 via analogue switches $S_1$, $S_2$. In the receiving mode, analogue switches $S_1$, $S_2$ are connected to terminals $r_1$, $r_2$ and an analogue switch $S_3$ becomes on. As a result, signals received from a remote terminal are processed and then supplied to modulator 15. Processing includes demodulation at a modulation and demodulation unit 53 are decoding at a coding and decoding unit 54, and then storing in a frame memory 55. Thereafter, the stored signals are supplied to a receiving line memory 56 for each line of information by uniform clock signals (not shown). Reading out picture signals from receiving line memory 56 is affected by variable clock signals from clock circuit 57 and PIN diode 41 to correct timing distortion of the received electrical image signals. The picture signals from line memory 56 are supplied to light modulator 15 via analogue switch $S_2$ for reproducing the transmitted image. Control unit 52 then controls motor 25 to permit the reproduction of the transmitted image on drum 24.

In the transmission mode, analogue switches $S_1$ and $S_2$ are connected to terminals t1, t2 and analogue switch $S_3$ become on. In this mode, reading of picture signals from document 32 is effected. That is, laser beam 14a scans document 32 by the movement of oscillating reflecting plate 22a. The light reflected from document 32 is converted into electrical picture signals by photo-multiplier 39. These electrical signals are supplied to line memory 58 through switch $S_1$ at each successive line scan.

The entry of the electrical picture signals in line memory 58 is affected under the control of available clock signals from detector 39 and clock circuit 57. The stored picture signals are read out from line memory 58 at a uniform clock rate and stored in frame memory 55. The picture signals are then read out from frame memory 55, processed and then transmitted to a remote terminal. Processing includes coding in a coding and decoding unit 54 and then modulating in a modulation and demodulation unit 53. The output of unit 53 is transmitted to a remote facsimile receiving apparatus (not shown).

Figure 5:
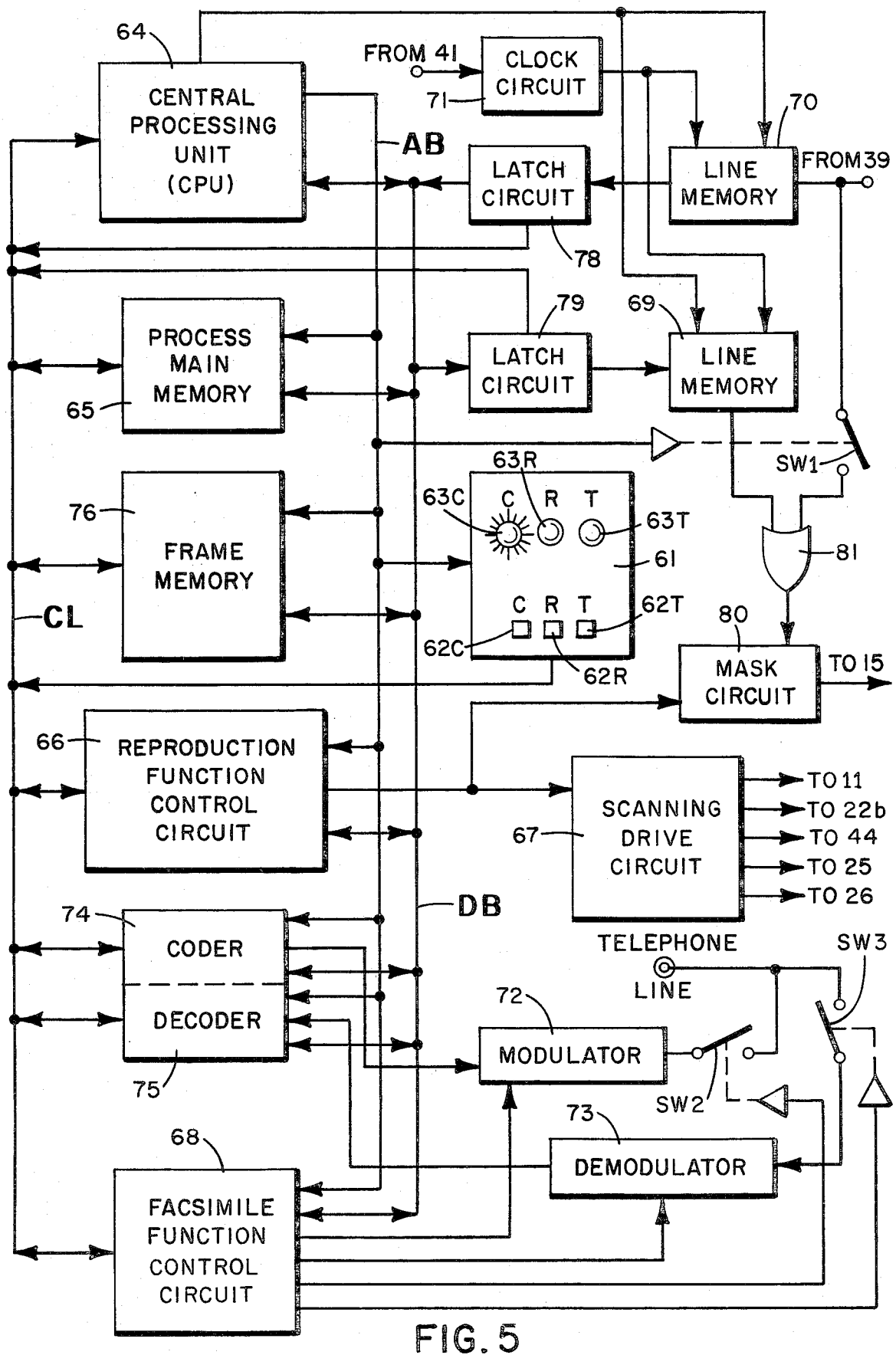
FIG. 5 shows a detailed block diagram of the circuitry shown in FIG. 4.

The electrical system for controlling the optical system shown in FIG. 2 is correspondingly shown in detail in FIG. 5. A mode selecting board 61 corresponds to mode selecting board 51; it contains three mode selecting buttons 62C, 62R, 62T and three mode display lamps 63C, 63R, 63T corresponding to the reproduction mode, the receiving mode, and the transmission mode, respectively. Control part 52 corresponds to a central processing unit (CPU) 64, a process main memory 65, a reproduction function control circuit 66, a scanning drive circuit 67 and a facsimile function control circuit 68. Line memories 56, 58 correspond to line memories 69, 70 and clock circuit 57 corresponds to a clock circuit 71. Modulation and demodulation unit 53 corresponds to a modulator 72 and a demodulator 73 and coding and decoding unit 54 corresponds to a coder 74 and a decoder 75. Frame memory 55 corresponds to a frame memory 76. The electrical system shown in FIG. 5 is further equipped with two latch circuits 78, 79, three analogue switches SW1, SW2, SW3, OR gate 81 and a mask circuit 80 for blanking the beam during scans.

When the reproduction mode is desired, reproduction mode button 62C on mode selecting board 61 is activated. A reproduction mode signal will then be supplied to central processing unit 64 through a control line (CL); in response, a control signal is supplied to mode selecting board 61 from central processing unit 64 through an address bus AB and reproduction mode lamp 63C is activated. Simultaneously, central process unit 64, through CL, instructs process main memory 65 and reproduction function control circuit 66 to commence the reproduction function. Reproduction control circuit 66 supplies a control signal to scanning drive circuit 67. Scanning drive circuit 67 activates laser light source 11, drives coil 22b of light deflector 22 and makes reflecting plate 22a oscillate. Scanning drive circuit 67 also activates motor 44 to move document 32, motor 25 to rotate cylindrical drum 24, and supplies high voltage to charge 26 so that recording may be affected. Further, when the reproduction mode is selected, analogue switch SW1 turns on and electrical signals obtained by photo-multiplier 39 are supplied to mask circuit 80 via OR gate 81. The picture signals passing through mask circuit 80 are supplied to light modulator 15 as modulating signals. The mask circuit 80 masks signals during the time period when the beam is retraced to begin another scan line.

When receiving mode button 62R is selected, receiving mode lamp 63R is activated and the following units are activated: process main memory 65, frame memory 76, reproduction function control circuit 66, decoder 75 and facsimile function control circuit 68. Further, analogue switch SW3 is activated by facsimile function control circuit 68 and demodulator 73 is activated. Signals received through a telephone line pass through analogue switch SW3 and are demodulated in demodulator 73 and are then decoded in decoder 75. These decoded facsimile signals are passed through data bus DB and each frame is stored in frame memory 76. The address of the data supplied by data bus line DB are directed by address bus line AB. The above decoded facsimile signals are conveyed at each line by data bus line DB and are latched in latch circuit 79. These signals are then stored in line memory 69 by uniform clock signals received from central processing unit 64. The read-out of these picture signals from line memory 69 is affected by variable clock signals from clock circuit 71 to correct for timing distortion. These picture signals are then supplied to light modulator 15 through OR circuit 81 and mask circuit 80.

When transmission mode button 62T is selected, transmission mode lamp 63T is activated and the following units are activated: process main memory 65, frame memory 76, reproduction functional control circuit 66, coder 74 and facsimile function control circuit 68. During this mode scanning drive circuit 67 operates laser light source 11, coil 22b and motor 44. In addition, modulator 72 is activated and analogue switch SW2 turns on by control of facsimile function control circuit 68. The electrical picture signals obtained from photomultiplier 39 by scanning document 32 are stored in line memory 70 by variable clock signals from clock circuit 71. The picture signals are read out from line memory 70 by uniform clock signals generated by CPU 64 and pass through latch circuit 78. These signals are then once stored in frame memory 76. The picture signals are read out in order from frame memory 76 and pass through data bus DB and are coded in coder 74. The coder picture signals are then modulated in modulator 72, and transmitted to a remote terminal via a telephone line and switch SW2.

In the embodiment of FIG. 2, the recording structure and reading structure are positioned on each side of light deflector 22. However, the beam 13 reflected by deflector 22 can be reflected in the distortion of light splitter 35 by a further reflector so that recording takes place adjacent light splitter 35.

We claim:

1. A beam scanning copying apparatus comprising:
light generating means for generating a first and second laser beam;
modulator means for modulating said second laser beam in accordance with modulating signals;
light deflecting means having at least a first and second reflecting face for deflecting said first and second laser beam within predetermined angular ranges, said first face reflecting the light from said first laser beam to produce a first reflected beam and said second face reflecting the light from said modulator means to produce a second reflected beam;
a light splitter for splitting the first reflected beam into a first and second split beam, said first split beam being directed onto a document for scanning the document;
first photoelectric means for detecting light reflected from said document and for converting it into electrical signals corresponding to an image on said document;
storage means responsive to variable clock signals for receiving and storing said electrical signals;
timing means coupled to said storage means and responsive to said second split beam for generating said variable clock signals for controlling the timing of the entry of said electrical signals into said storage means; and,
recording medium means scanned by the second reflected beam for recording information according to said modulating signals.

2. A beam scanning copying apparatus according to claim 1, wherein said light deflecting means comprises a galvano mirror oscillating within a 90° range and having two light reflecting faces.

3. A beam scanning copying apparatus according to claim 1, wherein said light deflecting means has at least three reflecting faces and rotates at a constant angular velocity.

4. A beam scanning copying apparatus according to claim 1, wherein said light generating means comprises light source means for generating a single laser beam and means for splitting said laser beam into said first laser beam and said second laser beam.

5. A beam scanning copying apparatus according to claim 1, wherein said light generating means comprises a first light source which generates said first laser beam and a second light source which generates said second laser beam.

6. A beam scanning copying apparatus according to claim 1, wherein said timing means comprises:
a plate containing equidistant marks through which said second split beam passes;
a reflecting means spaced downstream from said plate along the optical path of said second split beam for reflecting said second split beam; and,
second photoelectric means for receiving the light reflected by said reflecting means and generating said variable clock signals.

7. A beam scanning copying apparatus according to claim 6, wherein said plate comprises a transparent material with equidistant opaque marks.

8. A beam scanning copying apparatus according to claim 6, wherein said plate comprises an opaque material with equidistant transparent marks.

9. A beam scanning copying apparatus according to claim 1, wherein said modulating signals are said electrical signals.

10. A beam scanning copying apparatus for producing generated electrical signals corresponding to an image to be transmitted to a remote copying apparatus and for receiving electrical signals corresponding to an image transmitted from a remote copying apparatus comprising:
light generating means for generating a first and second laser beam;
modulator means for modulating said second laser beam in accordance with modulating signals;
light deflecting means having at least a first and second reflecting face for deflecting said first and second laser beam within predetermined angular ranges, said first face reflecting the light from said first laser beam to produce a first reflected beam and said second face reflecting the light from said modulator means to produce a second reflected beam;

a light splitter for splitting the first reflected beam into a first and second split beam, said first split beam being directed onto a document for scanning the document;

first photoelectric means for detecting light reflected from said document and for converting it into said generated electrical signals corresponding to an image on said document;

recording medium means scanned by the second reflected beam for recording information according to said modulating signals;

mode selector for selecting a transmission mode, a receiving mode, or a reproduction mode;

first storage means responsive to variable clock signals for receiving and storing said generated electrical signals when said mode selector is in the transmission mode, second storage means for receiving and storing said received electrical signals from said remote copying apparatus, said second storage means responsive to said variable clock signals for outputting said received electrical signals when said mode selector is in the receiving mode; and timing means coupled to said first and second storage means and responsive to said second split beam for generating said variable clock signals for controlling the timing of the entry of said generated electrical signals into said first storage means and the exit of said received electrical signals from said second storage means.

11. A beam scanning copying apparatus according to claim 10, wherein further comprises transmission means for reading out the generated electrical signals stored in said first storage means and transmitting the generated electrical signals when said mode selector is in the transmission mode, wherein said modulating signals are said received electrical signals when said mode selector is in the receiving mode and are said generated electrical signals when said mode selector is in the reproduction mode.

12. A beam scanning copying apparatus according to claim 10, wherein said light deflecting means comprises a galvano-mirror oscillating with a 90° range and having two light reflecting faces.

13. A beam scanning copying apparatus according to claim 10, wherein said light deflecting means has at least three reflecting faces and rotates at a constant angular velocity.

14. A beam scanning copying apparatus according to claim 10, wherein said light generating means comprises light source means for generating a single laser beam and means for splitting said laser beam into said first laser beam and said second laser beam.

15. A beam scanning copying apparatus according to claim 10, wherein said light generating means comprises a first light source which generates said first laser beam and a second light source which generates said second laser beam.

16. A beam scanning copying apparatus according to claim 10, wherein said timing means comprises:

a plate containing equidistant marks through which said second split beam passes;

a reflecting means spaced downstream from said plate along the optical path of said second split beam for reflecting said second split beam;

second photoelectric means for receiving the light reflected by said reflecting means and generating said variable clock signals.

17. A beam scanning copying apparatus according to claim 16, wherein said plate comprises a transparent material with equidistant opaque marks.

18. A beam scanning copying apparatus according to claim 16, wherein said plate comprises an opaque material with equidistant transparent marks.

* * * * *